J. W. Thompson.
Mower.
No. 3521. Reissued. June 29 1869.
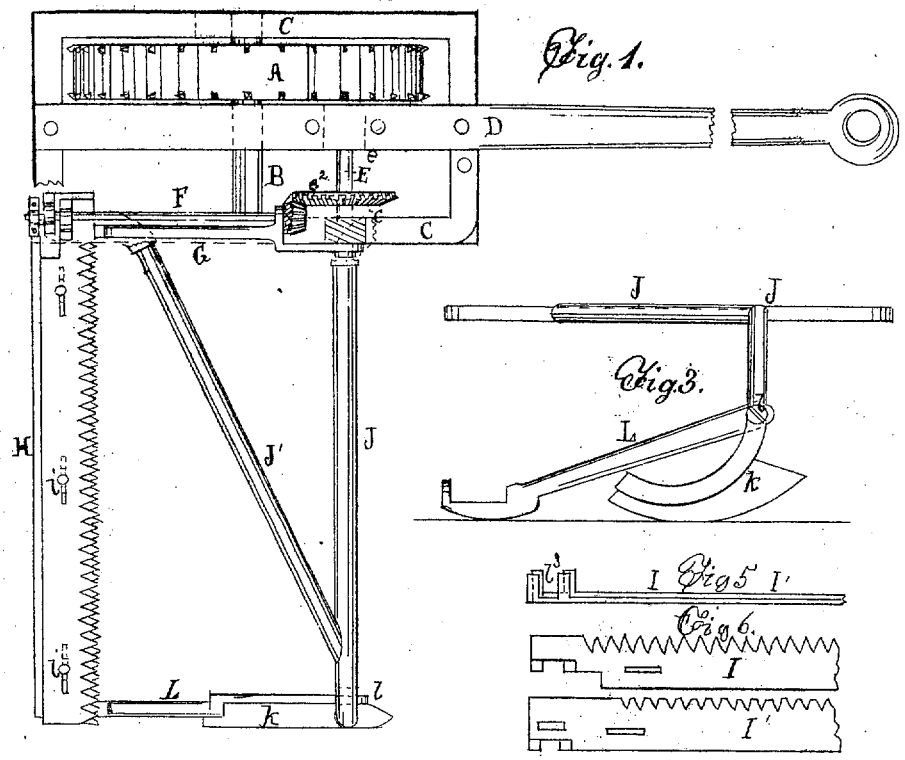
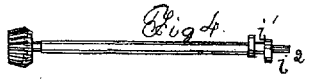
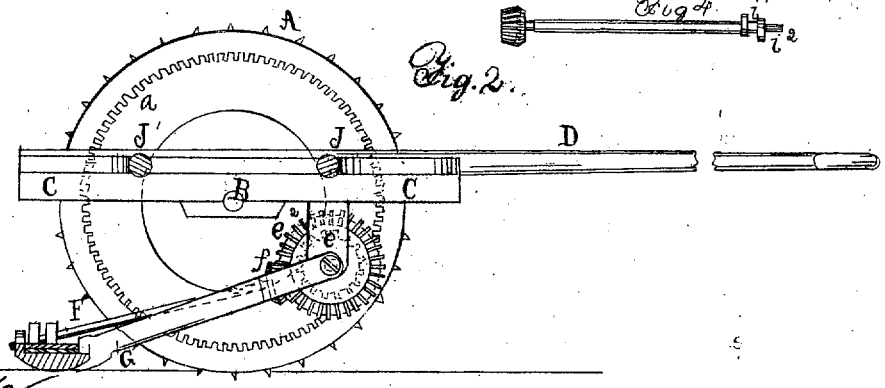
Witnesses.
Jos. D. Peyton.
Chas. De Long.
E. M. Sawyer
by his Atty
Wm. D. Adams

UNITED STATES PATENT OFFICE.

ELDRIDGE M. FOWLER, OF BAY CITY, MICHIGAN, ASSIGNEE OF JOHN W. THOMPSON.

IMPROVEMENT IN MOWING-MACHINES.

Specification forming part of Letters Patent No. 15,354, dated July 15, 1856; Reissue No. 3,521, dated June 29, 1869.

*To all whom it may concern:*

Be it known that JOHN W. THOMPSON, of Greenfield, in the county of Franklin and State of Massachusetts, did invent certain new and useful Improvements in Harvesters, of which the following is a full, clear, and exact description.

The invention herein claimed consists, first, in a novel method of combining in a rear-cut mowing-machine a frame carrying a laterally-projecting cutting apparatus arranged to vibrate about a center coincident with the center of rotation of a bevel-wheel which is mounted on an axis parallel with but independent of the main drive-wheel axle; second, in a novel method of combining in a rear-cut harvester a vibrating frame, carrying a shaft for driving the cutters, and a bevel-pinion with a frame carrying a bevel-wheel mounted on an axis independent of the main drive-wheel axle in such manner that the axis of rotation of said bevel-wheel and the axis of oscillation of the vibrating frame shall coincide.

In the accompanying drawings, Figure 1 represents a plan or top view of a mowing-machine embodying all of said improvements; Fig. 2, a view of the same, partly in elevation and partly in section, at the line *x x* of Fig. 1; Fig. 3, a view in elevation of the supporting-frame detached, as seen from the divider-side; Fig. 4, a view of the shaft which drives the cutters, detached; Fig. 5, an elevation, and Fig. 6 a plan, of the cutters detached.

A driving-wheel, A, turns with an axle, B, mounted in a main frame, C, from which a rigid tongue, D, projects. An internally-geared spur-wheel, *a*, on the driving-wheel, drives a corresponding pinion, *e*, (shown in dotted lines in Fig. 2,) on a counter-shaft, E, having its bearings in pendants *c c'* (only one of which shows in the drawing, the other being beneath the tongue) in front of the main axle. The counter-shaft E carries a bevel-wheel, $e^2$, gearing into a corresponding pinion, *f*, on the front end of a shaft, F, turning in bearings on an arm, G, pivoted to play freely vertically around the counter-shaft. The inner or heel end of the finger-beam H is secured to the vibrating hinged arm in such manner that the two rise and fall together.

The cutting apparatus in this instance consists of two scalloped cutters, I I', placed one above the other, held down by pins *i*, which enter longitudinal slots in the plate, and vibrated by cams $i'$ $i^2$ on the shaft F, which play in lugs $i^3$ in the cutters.

An overhanging arm, J, is projected from the main frame and vertically over the counter-shaft as far as the divider. This arm is strengthened by a brace, J'. The arm J is first curved downward and then rearward a distance a little greater than the semi-diameter of the driving-wheel, and is armed with a dividing-shoe, K, to separate the grass to be cut from that to be left standing.

An arm, L, attached to the divider end of the cutting apparatus, is pivoted to the arm J at *l*, which point is in line with the counter-shaft E, so that this arm L is free to vibrate also.

As the axis of movement of the arms G L is coincident with the counter-shaft, it will readily be perceived that the upward and downward movements of the cutting apparatus will not change the relative position of the bevel-wheel on the counter-shaft with the bevel-pinion on the shaft F, and therefore the cutting apparatus can adapt itself to every inequality of surface without in the slightest degree straining or disarranging the combination of parts that serve to communicate motion from the main driving-wheel to the cutters.

What is claimed herein as the invention of the said THOMPSON is—

1. In a rear-cut harvester, a frame carrying a cutting apparatus arranged to vibrate about a center coinciding with the center of rotation of a bevel-wheel which is mounted on an axis parallel with but independent of the main drive-wheel axle, the combination being and operating substantially as set forth.

2. The combination of a vibrating frame, carrying the shaft for driving the cutters, and a bevel-pinion with a frame carrying a bevel-wheel mounted on an axis independent of the main drive-wheel axle, in such manner that the axis of rotation of said bevel-wheel and the axis of oscillation of the vibrating frame shall coincide, the combination being and operating substantially as set forth.

ELDRIDGE M. FOWLER.

Witnesses:

L. BECKWITH,

I. C. LEWIS.